(12) United States Patent
Argoitia (10) Patent No.: US 7,955,695 B2
(45) Date of Patent: Jun. 7, 2011

(54) THREE-DIMENSIONAL ORIENTATION OF GRATED FLAKES

(75) Inventor: Alberto Argoitia, Santa Rosa, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 367 days.

(21) Appl. No.: 12/060,353

(22) Filed: Apr. 1, 2008

(65) Prior Publication Data

US 2008/0248255 A1    Oct. 9, 2008

Related U.S. Application Data

(60) Provisional application No. 60/909,998, filed on Apr. 4, 2007.

(51) Int. Cl.
*B32B 5/16* (2006.01)
*C09D 5/29* (2006.01)
*C04B 14/00* (2006.01)

(52) U.S. Cl. ........ 428/323; 428/167; 428/172; 428/400; 428/403; 106/31.64; 106/400

(58) Field of Classification Search ............... 428/105, 428/167, 172, 212, 323, 328, 329, 400, 403; 106/31.64, 400
See application file for complete search history.

(56) References Cited

U.S. PATENT DOCUMENTS

| | | | |
|---|---|---|---|
| 4,657,349 A | 4/1987 | Labes et al. | 359/296 |
| 5,364,689 A | 11/1994 | Kashiwagi et al. | 428/195.1 |
| 5,474,814 A * | 12/1995 | Komatsu et al. | 427/549 |
| 6,114,018 A | 9/2000 | Phillips et al. | 428/200 |
| 6,168,100 B1 * | 1/2001 | Kato et al. | 241/1 |
| 6,829,075 B1 | 12/2004 | Kosc et al. | 359/272 |
| 6,838,166 B2 | 1/2005 | Phillips et al. | 428/323 |
| 6,875,522 B2 | 4/2005 | Seto et al. | 428/611 |
| 6,902,807 B1 * | 6/2005 | Argoitia et al. | 428/403 |
| 7,241,489 B2 | 7/2007 | Argoitia et al. | 428/323 |
| 2003/0190473 A1 * | 10/2003 | Argoitia et al. | 428/403 |
| 2005/0123755 A1 * | 6/2005 | Argoitia et al. | 428/402 |
| 2006/0002656 A1 | 1/2006 | Cowan et al. | 385/31 |
| 2006/0263539 A1 | 11/2006 | Argoitia | 427/547 |

FOREIGN PATENT DOCUMENTS

| | | |
|---|---|---|
| EP | 1 353 197 | 10/2003 |
| EP | 1 741 757 | 1/2007 |
| EP | 1 780 040 | 5/2007 |
| WO | WO 2004/024836 | 3/2004 |
| WO | WO 2005/017048 | 2/2005 |

OTHER PUBLICATIONS

*Photophysics of Structural Color in the Morpho Butterflies* by Kinoshita et al., FORMA, 17, 2002, pp. 103-121.

(Continued)

*Primary Examiner* — Donald Loney (74) *Attorney, Agent, or Firm* — Matthew A. Pequignot; Pequignot + Myers LLC (57) ABSTRACT

The invention relates to a coating on a surface, including a carrier and a plurality of flakes dispersed therein. The flakes are oriented quasi-normally to the surface and have grooves extending quasi-parallel to the surface, wherein the plurality of flakes forms at least 50% of all grated flakes in the coating. The invention also relates to a method of aligning the flakes using external fields of different orientations.

14 Claims, 13 Drawing Sheets

OTHER PUBLICATIONS

*Investigating the Use of Replica Morpho Butterfly Scales for Colour Displays*, Rebecca Coath, Univ. of Southampton, IRP report, 2007, pp. 1-9.

*Nano-Optics in the Biological World: Beetles, Butterflies, Birds and Moths* by Mohan Srinivasarao, Chemical Reviews, 99, 1999, pp. 1935-1961.

Watanabe et al., "Brilliant Blue Observation from a Morpho-Butterfly-Scale Quasi-Structure", Japanese Journal of Applied Physics, vol. 44, 2005, pp. L48-L50.

Rajca et al., "Magnetic Ordering in an Organic Polymer", Science, vol. 294, No. 5546, 2001, pp. 1503-1505.

M. Aschwanden and A. Stemmer, "Polymeric, electrically tunable diffraction grating based on artificial muscles", Optics Letters, vol. 31, No. 17, 2006, pp. 2610-2612.

Uma et al., "Elastomer_Based Diffractive Optical Modulator", IEEE Journal of selected topics in quantum electronics, vol. 10, No. 3, 2004, pp. 435-439.

* cited by examiner

THREE-DIMENSIONAL ORIENTATION OF GRATED FLAKES

The present invention claims priority from U.S. Provisional Patent Application Ser. No. 60/909,998 filed Apr. 4, 2007, entitled "BIOMIMICKING USING ALIGNABLE MICROSTRUCTURED FLAKES" by Argoitia, which is incorporated herein by reference for all purposes.

TECHNICAL FIELD

The present invention relates to pigment flakes, and more particularly to coatings including pigment flakes, that is, flakes having a grating formed therein or thereon, arranged in a particular order.

BACKGROUND OF THE INVENTION

A variety of optical structures have been proposed in order to imitate iridescent colors occurring in nature, for example, in wings of the Morpho butterflies and feathers of some birds such as the hummingbirds.

Figure 1:
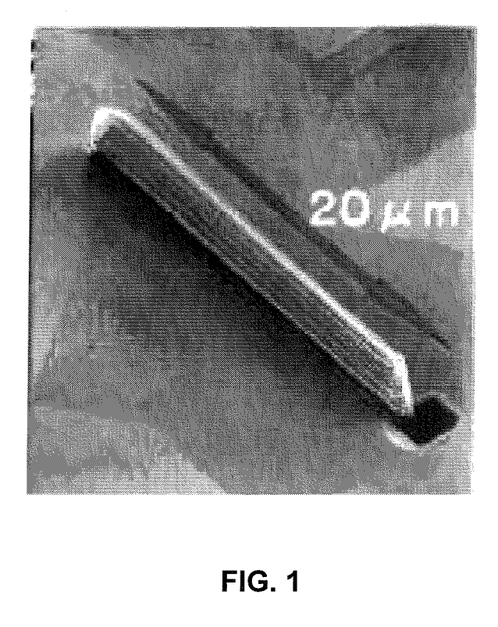
FIG. 1 is a perspective view of a three-dimensional nanostructure simulating a wing scale of the Morpho butterfly, according to the prior art.
Figure 2:
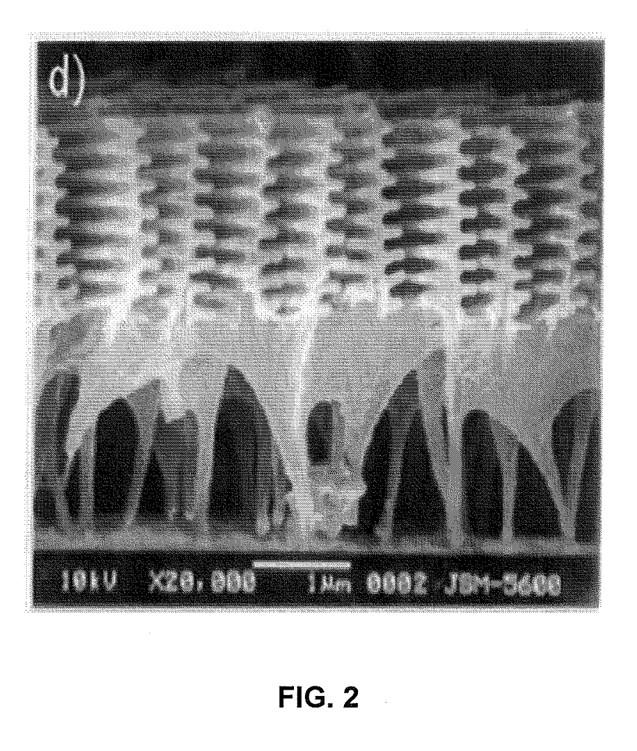
FIG. 2 is a microphotograph of a wing structure of the Morpho butterfly, according to the prior art.

A three-dimensional nanostructure shown in FIG. 1 simulates wing scales of the Morpho butterfly; the nanostructure has been disclosed by Watanabe et al. in *Brilliant Blue Observation from a Morpho-Butterfly-Scale Quasi-Structure*, Japanese Journal of Applied Physics, Vol. 44, pp. L48-L50, 2005. The structure has been fabricated using focused-beam chemical vapor deposition (FIB-CVD) technique, and the desired color effect has been observed under a microscope. However, the Morpho butterfly wings contain multiple structures in close proximity to each other, as shown in FIG. 2 from *Photophysics of Structural Color in the Morpho Butterflies* by Kinoshita et al., FORMA, 17, pp. 103-121, 2002, and the Watanabe's structure resembles only one of them. This technique is complicated and it would be extremely difficult, if not impossible, to produce multiple side-by-side structures using the method used by Watanabe et al. in manufacturing the isolated three-dimensional structure.

Figure 3:
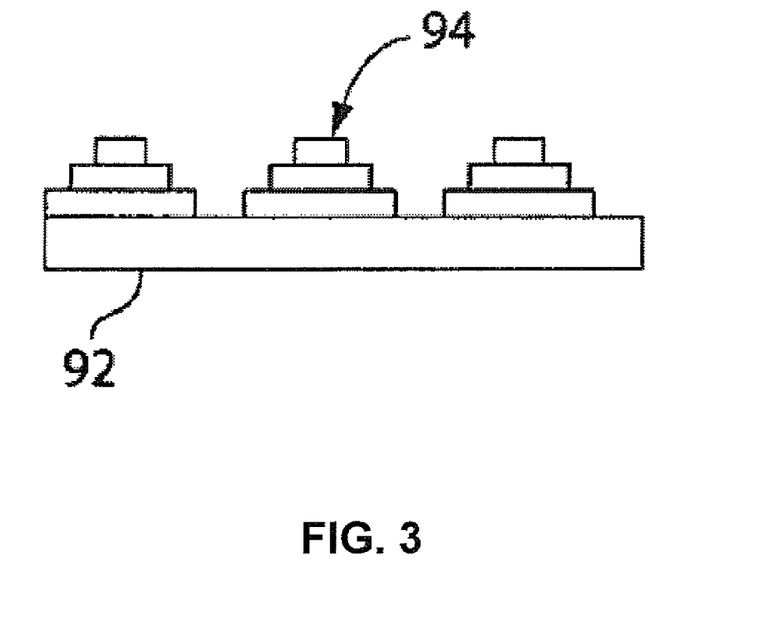
FIG. 3 is a cross-sectional view of a stepped optical structure, according to the prior art.

U.S. Patent Application No. 20060002656 published Jan. 5, 2006, in the name of Cowan et al., teaches stepped surface relief optical structures shown in FIG. 3, which produce a narrow band of color by resonance or constructive interference of reflected light. The stepped structures 94 are known as Aztec structures and can be formed by holographic techniques, and then replicated onto a continuous film 92. However, use of the film with stepped structures for security/authentication purposes is limited by the fact that the film is manufactured separately and then bonded to a substrate, such as a secure document, therefore counterfeiters can obtain the film directly from its manufacturer or detach it from a valid document.

R. Coath in *Investigating the Use of Replica Morpho Butterfly Scales for Colour Displays*, Univ. of Southampton, IRP report, pp. 1-9, 2007, teaches depositing multiple layers of materials having different indices of refraction on a silicon wafer, followed by electron beam lithography and selective etching of the multilayer design to create a tree-like structure similar to the wings of the Morpho butterfly. This technique is also complicated and costly.

An object of the present invention is to provide an iridescent coating overcoming the shortcomings of the prior art and a method of manufacturing thereof.

SUMMARY OF THE INVENTION

Accordingly, the present invention relates to a coating on a surface, comprising a carrier and a plurality of flakes dispersed therein, wherein each of the plurality of flakes is oriented quasi-normally to the surface and has a first set of grooves extending along a first direction quasi-parallel to the surface, and wherein the plurality of flakes forms at least 50% of all grated flakes in the coating.

Another aspect of the present invention relates to a method of manufacturing the aforementioned coating, comprising the steps of: providing the carrier having the plurality of flakes dispersed therein to the surface, applying a first external field having first field lines forming the first angle with the surface, for orienting the plurality of flakes; and, applying a second external field having second field lines forming a second angle of no greater than 30 degrees with the surface, for further orienting the plurality of flakes.

BRIEF DESCRIPTION OF THE DRAWINGS

The invention will be described in greater detail with reference to the accompanying drawings which represent preferred embodiments thereof, wherein.

DETAILED DESCRIPTION

To overcome some disadvantages of the prior art, one may consider using an ink with grated flakes dispersed therein.

Figure 4:
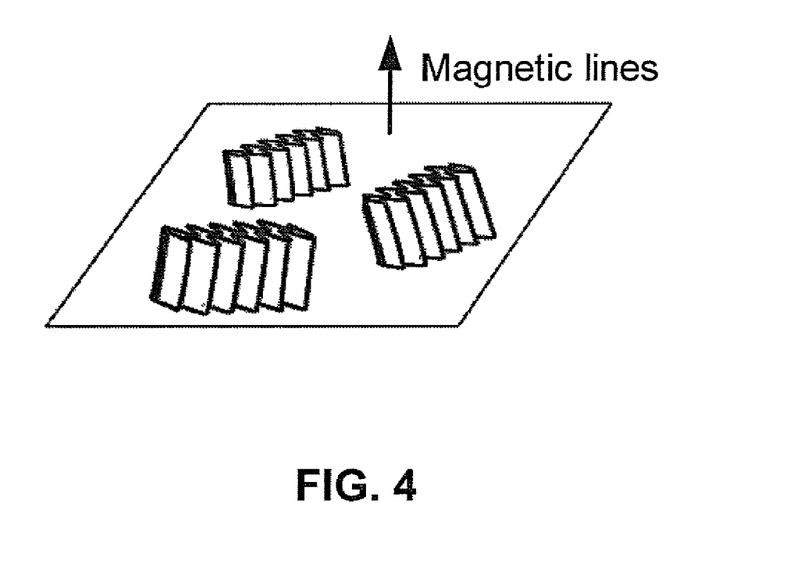
FIG. 4 is a perspective view of grated flakes conventionally oriented in a magnetic field orthogonal to the sample surface.

However, it is obvious to a person skilled in the art, that an attempt to orient the flakes using a magnetic field oriented normally or subnormally to the substrate, would not result in a structure resembling one shown in FIG. 2. Indeed, as shown in FIG. 4, the grated flakes would have grooves oriented along the magnetic field lines, that is normally to the substrate, and thus the diffraction effect would not be visible in the normal direction of observation.

Unlike coatings with conventionally oriented flakes, the coating of the instant invention produces bright iridescent colors because it closely imitates the structure of the Morpho butterfly's wings and other structural colors occurring in nature. The coating of the instant invention contains flakes having a grating formed therein or thereon, aligned in a particular manner: the flakes are oriented quasi-normally to the surface of the substrate and have grating grooves quasi-parallel to the surface, thus resonating a narrow band of color reflected to an observer by thin film and/or diffractive light interference of particular wavelengths.

Figure 5:
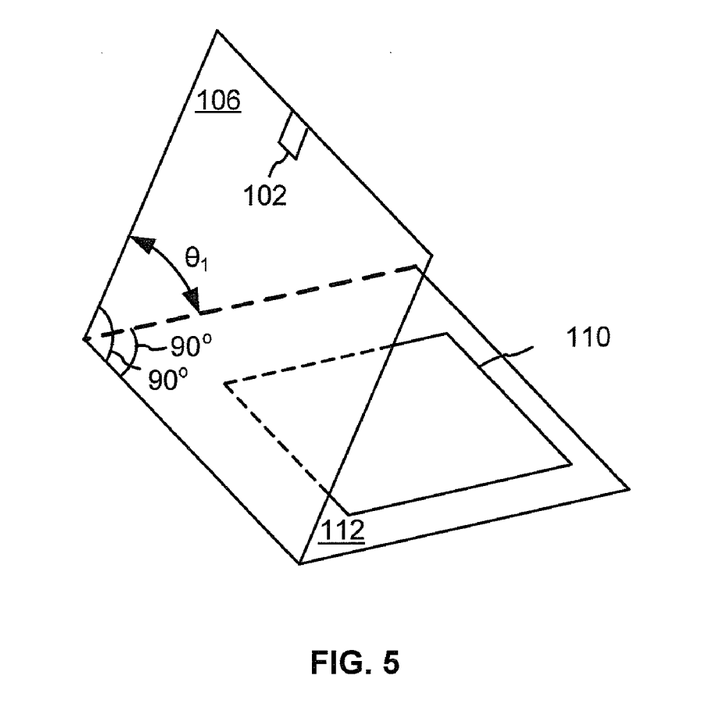
FIG. 5 is a schematic diagram of spatial relationship between a flake and a substrate.

For the purpose of this disclosure, the term "quasi-normally to a surface" means that the flakes are normal to the surface or tilted to form a first angle of at least 45 degrees with the surface. With reference to FIG. 5, a first angle between a flake 102 and a substrate 110 is equal to an angle $\theta_1$ between planes 106 and 112 containing the flake 102 and the substrate 110, respectively. The term "quasi-parallel to the surface" means that the grooves are parallel to the surface or slanted in a direction forming a second angle of no greater than 30 degrees with the surface.

According to the method of the instant invention, grated flakes are oriented by application of an external field. The external field can be a magnetic field, and the flakes then contain a magnetically responsive material. Optionally, the flakes include other materials; for example, a highly reflective layer on top of the layer of magnetically responsive material. By way of example, suitable magnetically responsive materials are iron, cobalt, nickel; alloys such as Ni—Co or Nd—Fe—B; inorganic oxide compounds such as $Fe_2O_3$, $Fe_3O_4$, chromium dioxide $CrO_2$, ferrites $MFe_2O_4$ (with M an ion or a cocktail of ions selected from the group consisting of $Mg^{2+}$, $Ca^{2+}$, $Sr^{2+}$, $Ba^{2+}$, $Mn^{2+}$, $Co^{2+}$, $Fe^{2+}$, $Ni^{2+}$, $Cu^{2+}$, $Zn^{2+}$, etc.), garnets $A_3B_5O_{12}$ (with A=a trivalent rare earth-ion or a cocktail of trivalent rare-earth ions and B an ion or a cocktail of ions selected from the group consisting of $Al^{3+}$, $Cr^{3+}$, $Fe^{3+}$, $Ga^{3+}$, $Bi^{3+}$, etc.), hexaferrites $MFe_{12}O_{19}$ with M selected from the group of divalent ions $Ca^{2+}$, $Sr^{2+}$, $Ba^{2+}$, etc., perovskites, etc.

Figure 19:
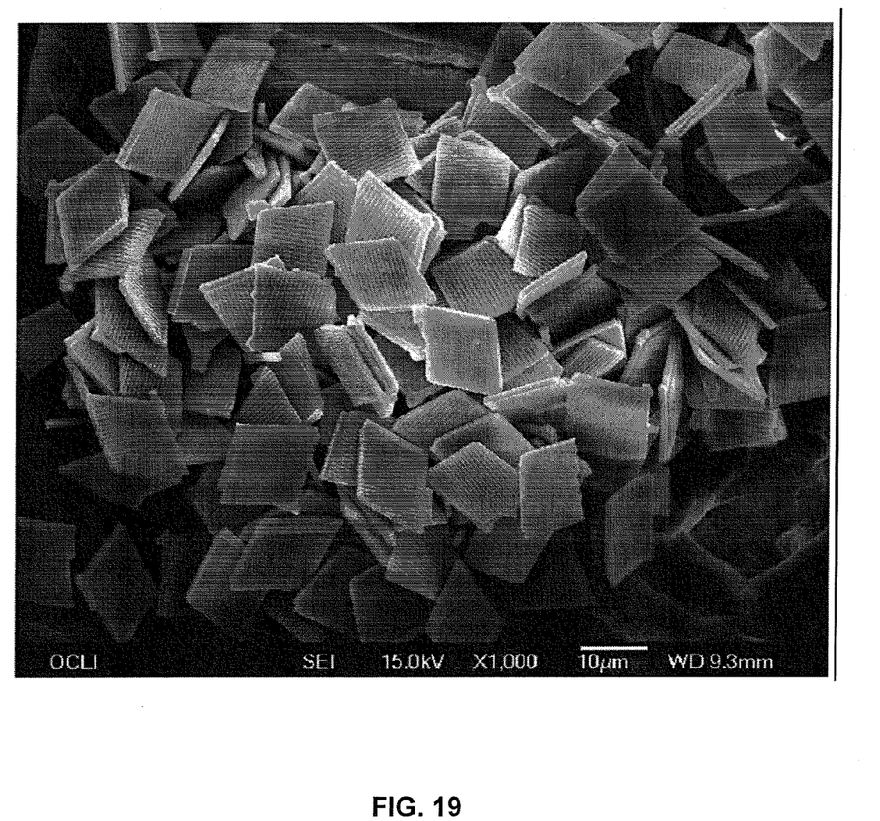
FIG. 19 is a microphotograph of linear-grated, shaped flakes.

The average diameter of the flakes is in the range of 3 to 50 microns, and an average thickness is in the range of 0.05 to 10 microns. The flakes are made as taught, for example, in U.S. Pat. No. 7,241,489 issued Jul. 10, 2007, to Argoitia et al., incorporated herein by reference and referred to herein as '489. By way of example, FIG. 19 is a microphotograph of shaped flakes having 1400 l/mm linear grating. Alternatively, any conventional method for providing grated flakes, having a predefined shape or randomly-shaped, can be used.

The flakes have grating frequency between 500 lines/mm and 4000 lines/mm, which corresponds to 250 nm to 2000 nm separations between adjacent grooves. For providing the iridescent blue color, the grating frequency is preferably between 2000 l/mm and 4000 l/mm.

By way of example, the carrier can be polyvinyl alcohol, polyvinyl acetate polyvinylpyrrolidone, poly(ethoxyethylene), poly(methoxyethylene), poly(acrylic) acid, poly(acrylamide), poly(oxyethylene), poly(maleic anhydride), hydroxyethyl cellulose, cellulose acetate, poly(sacchrides) such as gum arabic and pectin, poly(acetals) such as polyvinylbutyral, poly(vinyl halides) such as polyvinyl chloride and polyvinylene chloride, poly(dienes) such as polybutadiene, poly(alkenes) such as polyethylene, poly(acrylates) such as polymethyl acrylate, poly(methacrylates) such as poly methylmethacrylate, poly(carbonates) such as poly(oxycarbonyl oxyhexamethylen), poly(esters) such as polyethylene terephthalate, poly(urethanes), poly(siloxanes), poly(suphides), poly(sulphones), poly(vinylnitriles), poly(acrylonitriles), poly(styrene), poly(phenylenes) such as poly(2,5 dihydroxy-1,4-phenyleneethylene), poly(amides), natural rubbers, formaldahyde resins, other polymers and mixtures of polymers and polymers with solvents.

In one embodiment of the instant invention, an iridescent coating on a sample surface is manufactured as follows. Initially, with reference to FIG. 6, a carrier 230 containing grated magnetically-alignable flakes 240 is provided onto the surface of a sample substrate 200, forming together a coated sample 201. By way of example, the substrate 200 is a paper sheet, and the carrier 230 is printed thereon.

Figure 6:
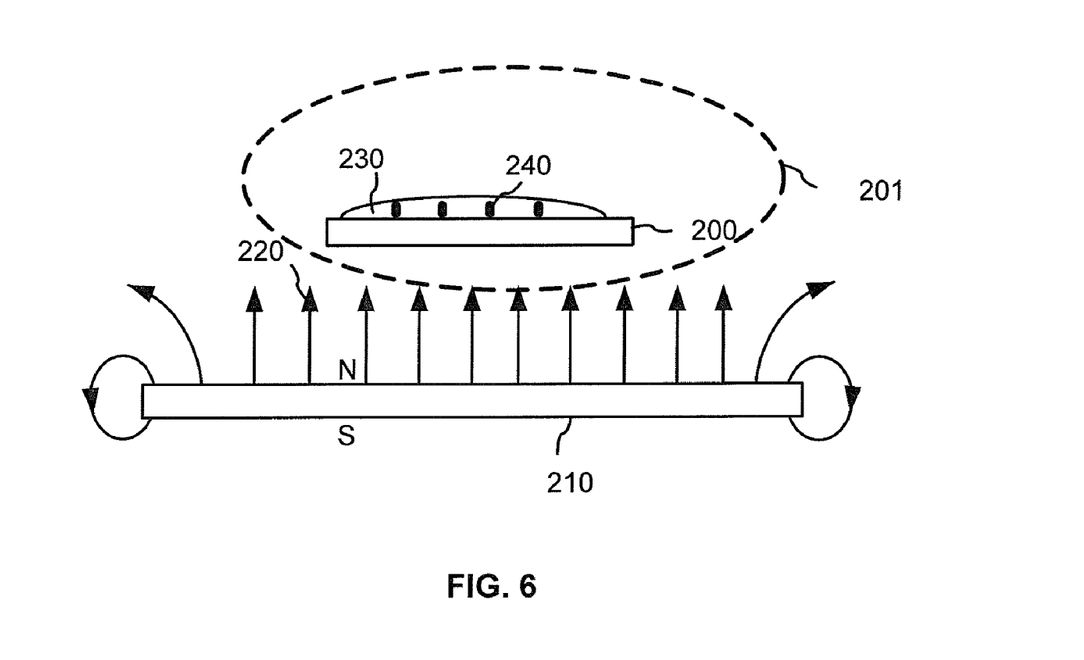
FIG. 6 is a schematic representation of a first alignment step, according to the instant invention.
Figure 7:
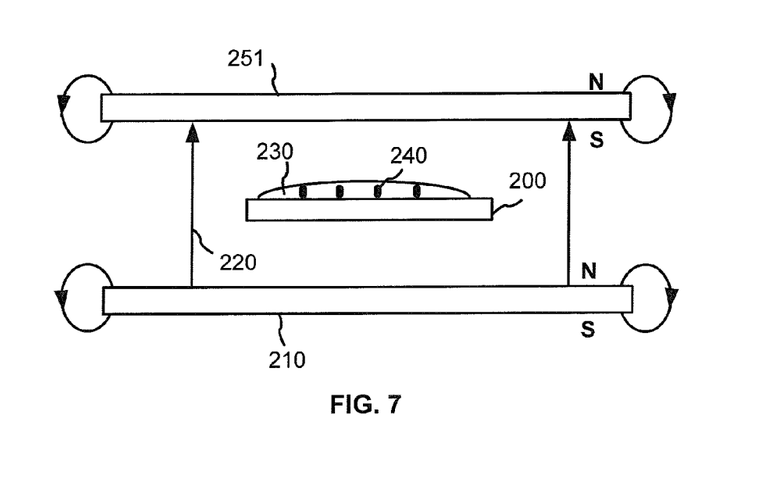
FIG. 7 is a schematic representation of a variation of the first alignment step.

In a first alignment step, a first magnetic field having a quasi-normal orientation in respect to the surface of the substrate is applied for orienting the plurality of flakes. For this purpose, a permanent magnet 210 is placed under the substrate 200 so that magnetic field lines 220 are quasi-normal to the surface of the substrate 200. With reference to FIG. 7, an optional second magnet 251 is placed above the sample 201. Alternatively, the coated sample 201 is passed over a magnet in the direction shown by arrow 260 in FIG. 8, or the magnet is passed under the sample 201. As a result of applying the first magnetic field, a significant number of the grated flakes align themselves quasi-normally to the substrate.

Figure 9:
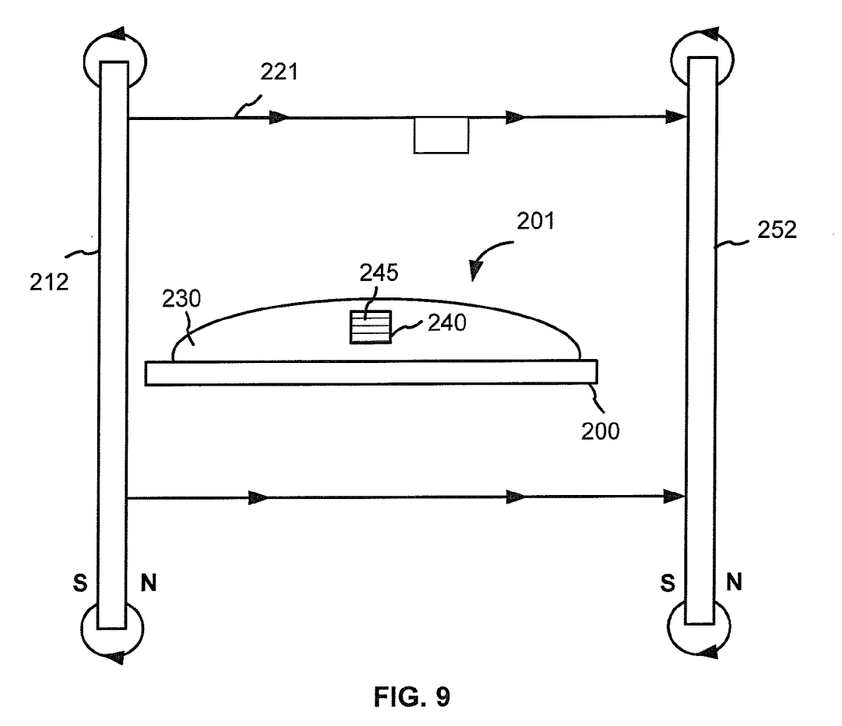
FIG. 9 is a schematic representation of a second alignment step.

In a second alignment step illustrated by FIG. 9, a second magnetic field having a quasi-parallel orientation in respect to the surface of the substrate 200 is applied for rotating the flakes 240 so that the grating grooves 245 are aligned parallel to the substrate 200. For this purpose, one or more magnets, shown as magnets 212 and 252, are placed at the sides of the sample 201, so that the magnetic field lines 221 are quasi-parallel to the surface of the substrate 200. Optionally, the magnets 212 and 252 are the same magnets used in the previous alignment step, denoted as the magnets 210 and 251 in FIGS. 6 and 7. In this instance, between the first and second alignment steps, either the magnets 210 and 251 are moved in respect to the sample 201, or the sample 201 is rotated preferably by 90 degrees.

Figure 20:
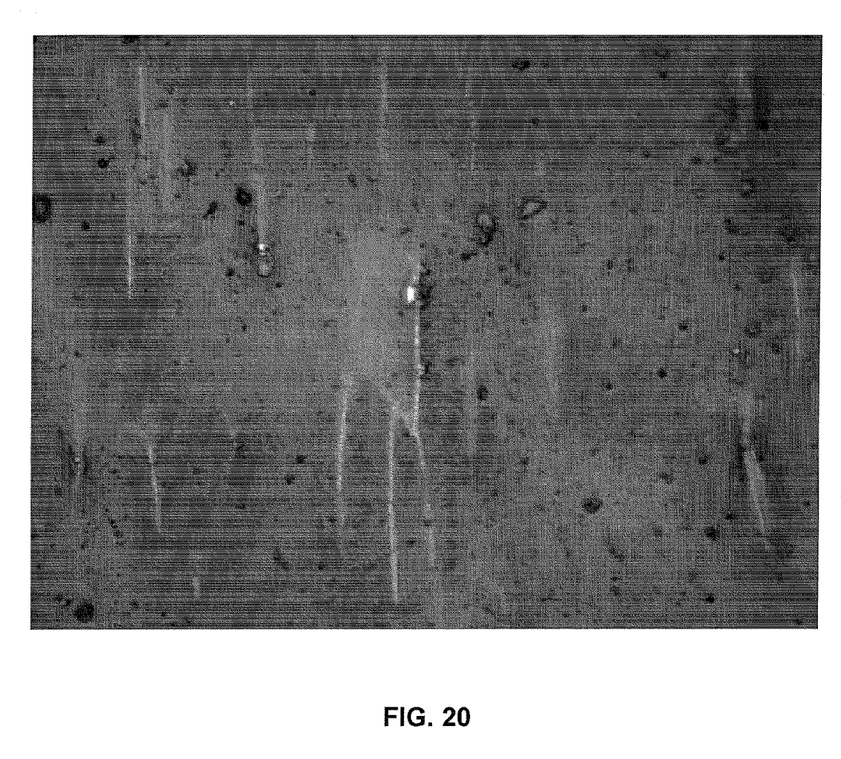
FIG. 20 is a microphotograph of flakes quasi-parallel to each other.

Advantageously, after the two aforedescribed steps of magnetic alignment, not only the flakes are oriented quasi-normally to the substrate and grooves are oriented quasi-parallel to the substrate, but also many of the flakes are quasi-parallel to each other, wherein two planes containing the two flakes are parallel or form an angle of no greater than 30 degrees. By way of example, the quasi-parallel alignment of the flakes is shown in a microphotograph in FIG. 20.

Figure 10:
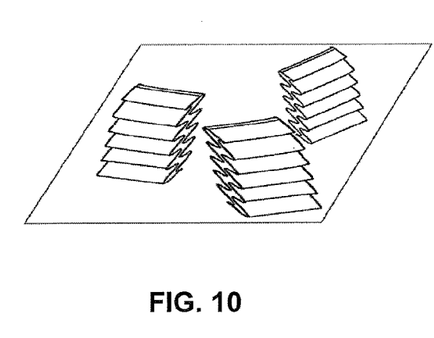
FIG. 10 is a perspective view of grated flakes randomly oriented with respect to each other.
Figure 11:
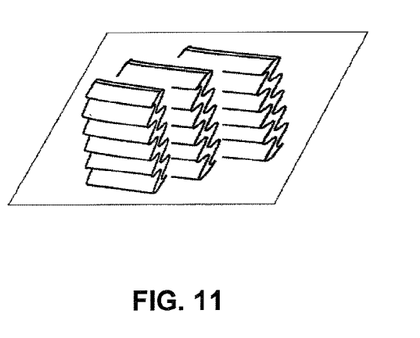
FIG. 11 is a perspective view of grated flakes oriented quasi-parallel to each other.

In the instance of random orientation of flakes in respect to each other, as shown in FIG. 10, the iridescent color can be observed at any viewing angle. In the instance of quasi-parallel orientation of flakes in respect to each other, as shown in FIG. 11, the color is stronger than in the sample shown in FIG. 10, and observed only when the grooves are perpendicular to the illumination and viewing plane; for illumination or viewing conditions parallel to the grooves, no iridescent color is observed. The polarization effect provided by the sample shown in FIG. 11 is similar to the effect observed in the Morpho butterfly wings.

The portion of the flakes aligned parallel to each other depends on magnetic properties of the flakes and magnets, as well as the flake mass and properties of the carrier. In order to increase the portion of the flakes parallel to each other, the aforedescribed pair of alignment steps should be repeated. By way of example, after the initial coating step, the two steps described with reference to FIGS. 6 and 9 are performed, then the step illustrated by FIG. 6, and after that the step illustrated by FIG. 9, and so on, until the portion of the flakes parallel to each other reaches at least 70% of all the grated flakes in the coating.

Figure 8:
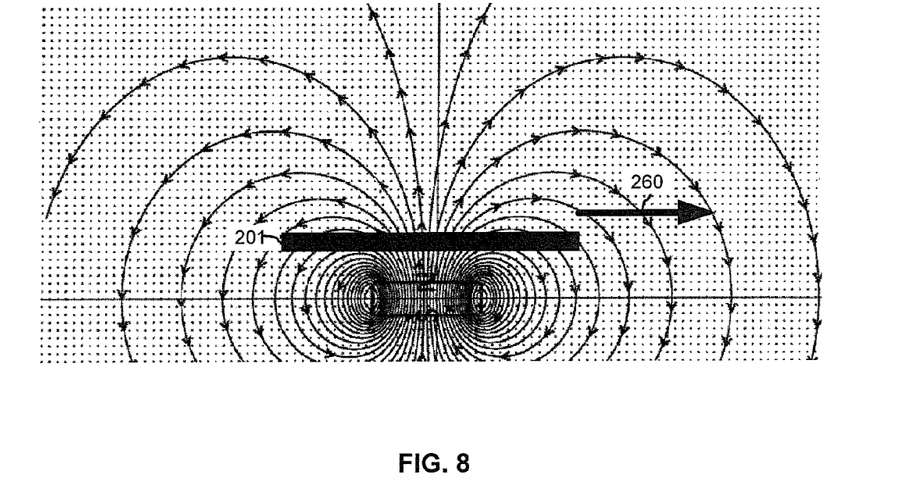
FIG. 8 is a schematic representation of another variation of the first alignment step.

In another method described herein with reference to FIG. 8, the coated sample 201 with cross-grated flakes is passed over a magnet in the direction shown by arrow 260, and then it is passed again over the magnet in a direction perpendicular to the arrow 260 and to the plane of the drawing. These steps can be repeated multiple times to improve the final alignment. The angle $\theta_1$ shown in FIG. 5 can be obtained by tilting the coated sample 201 or the magnetic setup in one of the two directions, by way of example the direction of the arrow 260. Alternatively, the coated sample 201 is passed over a series of magnets with differently aligned magnetic fields as described before. With the same purpose, instead of passing the sample over the magnet(s), a magnet (or a series of magnets) can be passed under or over the coated sample.

Optionally, after completing the alignment steps, the carrier in the coating is solidified, for example by drying.

Figure 12:
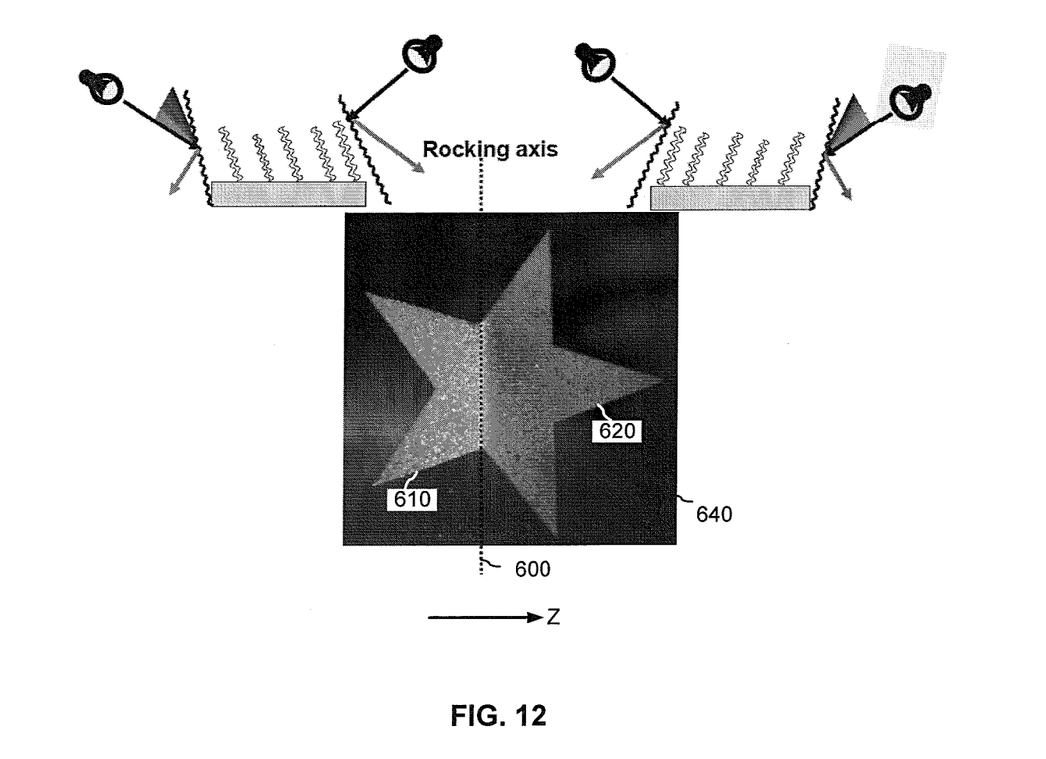
FIG. 12 is a schematic representation of a security device with a rocking axis.

A coating with flakes aligned by the aforedescribed method can be used in security and authentication devices, such as a device shown in FIG. 12 made using a UV curable silk screen ink base as a carrier and grated, magnetically-alignable flakes dispersed therein. The flakes have five layers: a 50 nm layer of Ni in the middle, two layers of aluminum on both sides of the Ni layer, each about 50 nm thick, and two layers of $MgF_2$ about 200 nm thick on the aluminum layers, and a one-directional grating of about 3800 l/mm. The flakes have the following 5 layers: 200 nm MgF2/50 nm Al/50 nm Ni/50 nm Al/200 nm MgF2. The flakes are oriented quasi-normally to the substrate 640, wherein flakes in a region 620 are tilted in the direction of axis Z, and flakes in a region 610 are tilted in the direction opposite to the axis Z. According to the instant invention, the flakes have been aligned to have the grating quasi-parallel to the substrate. When the device is rocked along an axis 600 in one direction, the region 620 appears surprisingly iridescent blue and the region 610 appears silver. When the device is rocked in the other direction, the region 620 appears silver and the region 610 appears iridescent blue.

Figure 16:
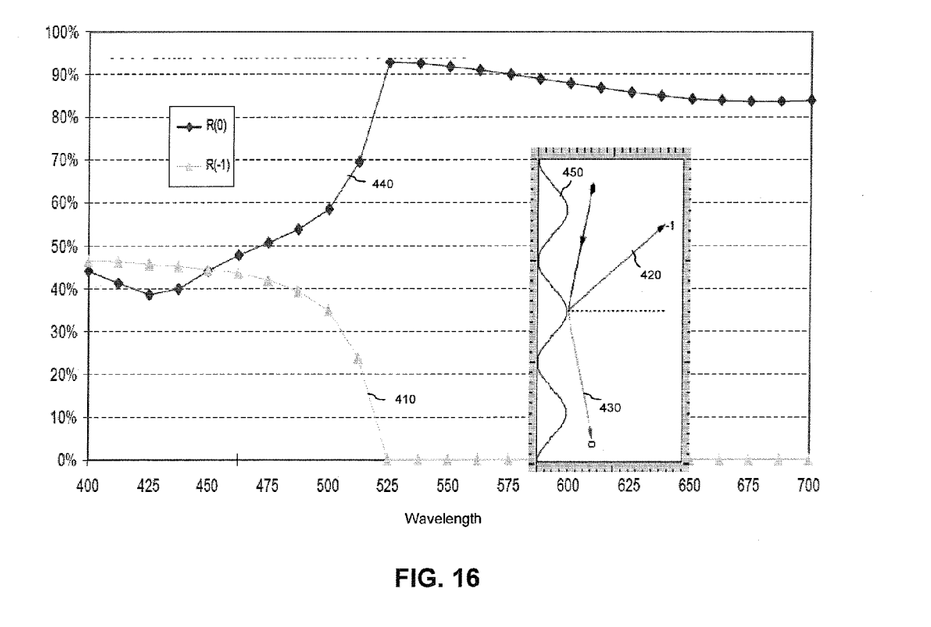
FIG. 16 is a graph of the efficiency of the reflected or diffracted light vs. wavelength for a 3800 l/mm grating.

High frequency cross-grated flakes having more than 3800 lines per mm provide a blue iridescent color as the Morpho butterflies by the alignment of the flakes quasi-normally with respect to the substrate. Indeed, for a 3800 l/mm grating frequency and the angle of incidence around 75 degrees, only wavelengths shorter than about 525 nm (blue) are diffracted back in the direction of the incident beam, as indicated by FIG. 16, wherein a curve 410 illustrates the reflectivity of the light diffracted-refracted back by a flake 450 to the observer in direction 420, and a curve 440—the amount of incident light reflected towards the sample substrate in direction 430.

In one embodiment of the instant invention the flakes are transparent or semi-transparent, for example having $Fe_{30}O_4$ or Ni magnetic layers thin enough to be semi-transparent. Alternatively, polymeric magnetic materials such as disclosed by Rajca et al. in Magnetic Ordering in an Organic Polymer, Science, Vol. 294, no. 5546, pp. 1503-1505, 2001, can be used in the flakes of the instant invention.

Alternatively, a magnetic field for aligning the grated flakes is provided by one or more electromagnets.

In one embodiment of the instant inventions, a coating includes cross-grated flakes oriented quasi-normally with respect to the substrate. The cross-grated flakes have two sets of grooves extending along two directions, forming an angle of at least 45 degrees, and preferably 80-90 degrees. Alternatively, a superposition of more than two linear gratings can be used.

Using the cross-grated flakes requires fewer steps for their orientation to provide similar optical results as the coating with linear-grated flakes aligned as shown in FIG. 11, therefore facilitating the coating application process.

High frequency cross-grated flakes having more than 3800 lines per mm provide a blue iridescent color as the Morpho butterflies by the alignment of the flakes quasi-normally with respect to the substrate and quasi parallel to each other. Further alignment steps, such as applying a magnetic field quasi-parallel to the substrate and another application of the quasi-normally oriented magnetic field, would advance the color effects.

Figure 13:
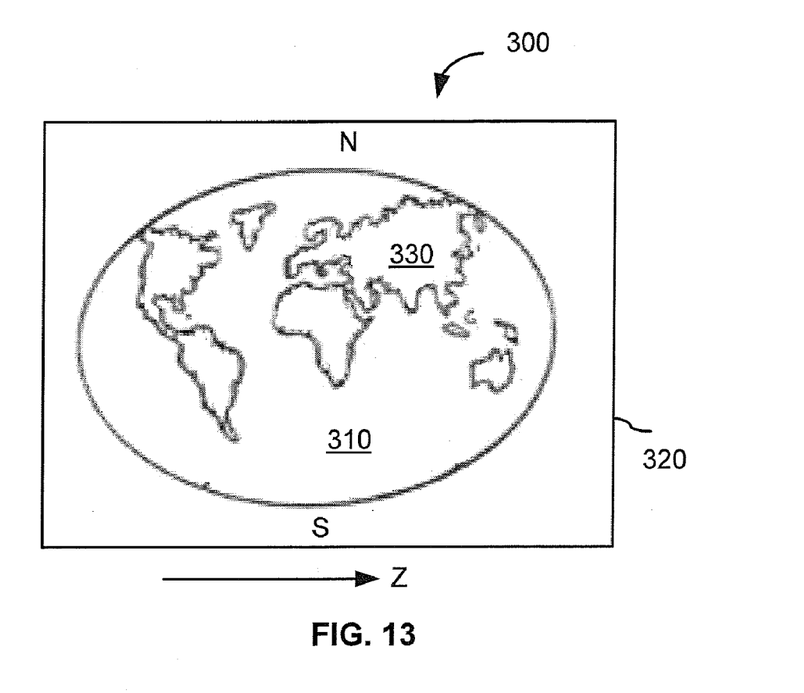
FIG. 13 is a schematic representation of a sample having flake oriented quasi-normal to the surface and flakes parallel to the surface of the sample.

With reference to FIG. 13, a sample print 300 of a word "map" has been manufactured using a UV curable silk screen ink base as a carrier and cross-grated magnetically-alignable flakes dispersed therein. The flakes have a 5 layer design: 200 nm MgF2/50 nm Al/50 nm Ni/50 nm Al/200 nm MgF2, and a grating frequency of about 3700 to 3800 l/mm in each of the two directions.

Figure 14:
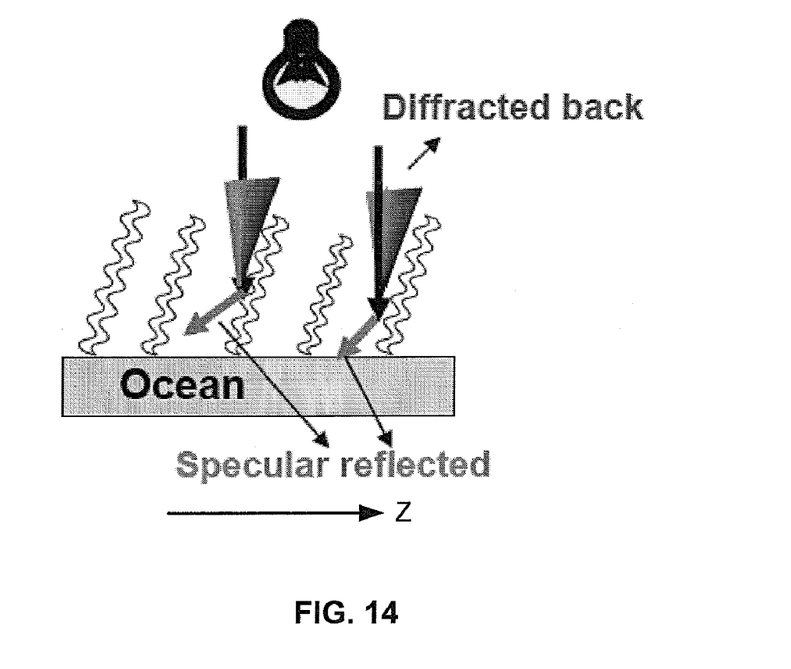
FIG. 14 is a schematic representation of the optical effects on the "ocean" regions of the sample shown in FIG. 13.

The ink was applied by silk screen printing method to create oceans 310 over a black surface of a Leneta card 320. Once the ink had been applied, the printed sample was passed over a permanent magnet. The magnet's pole orientation was such that the magnetic field lines were perpendicular and slightly tilted to the plane of the Leneta card in the direction of Z axis as shown in FIG. 14. In order for the sample to reflect the normal incident light back in the normal direction, the flakes were tilted few degrees with respect to the normal to create a diffractive beam. In the coatings made according to this invention, the preferred orientation for the flakes is 75+/− 10 degrees in respect to the substrate surface.

Figure 15:
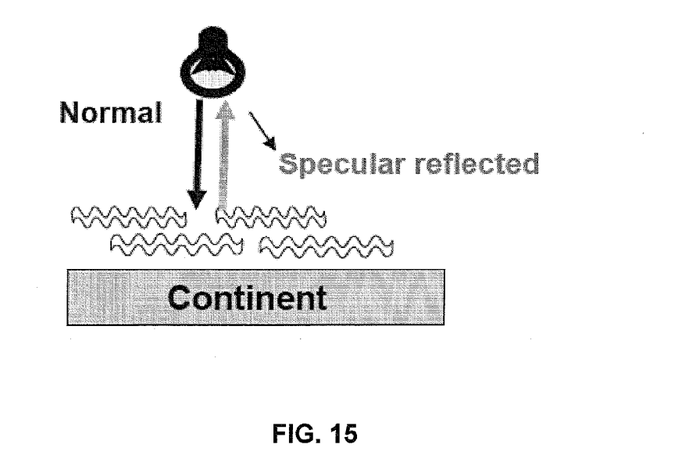
FIG. 15 is a schematic representation of the optical effects on the "continent" regions of the sample shown in FIG. 13.

Continents 330 were printed with the same ink, but no magnetic field was applied, therefore the continents 330 are formed by flakes mostly parallel to the Leneta card as shown in FIG. 15.

When the sample 300 is observed from the normal direction, the oceans 310 appear iridescent blue, and the continents 330 appear to have a silver color. The blue coloration is due to the grating frequency as discussed above with reference to FIG. 16. Tilting and rotating the sample make the oceans and continents appear gray or blue depending on the illumination and viewing conditions.

In one embodiment of the instant invention, the grated flakes have a predefined shape and size. The method of manufacturing such flakes is taught in the '489 patent. By way of example, a square-shaped flake has a side of about 10 microns and contains 14 grooves, parallel to one of the square sides.

Figure 17:
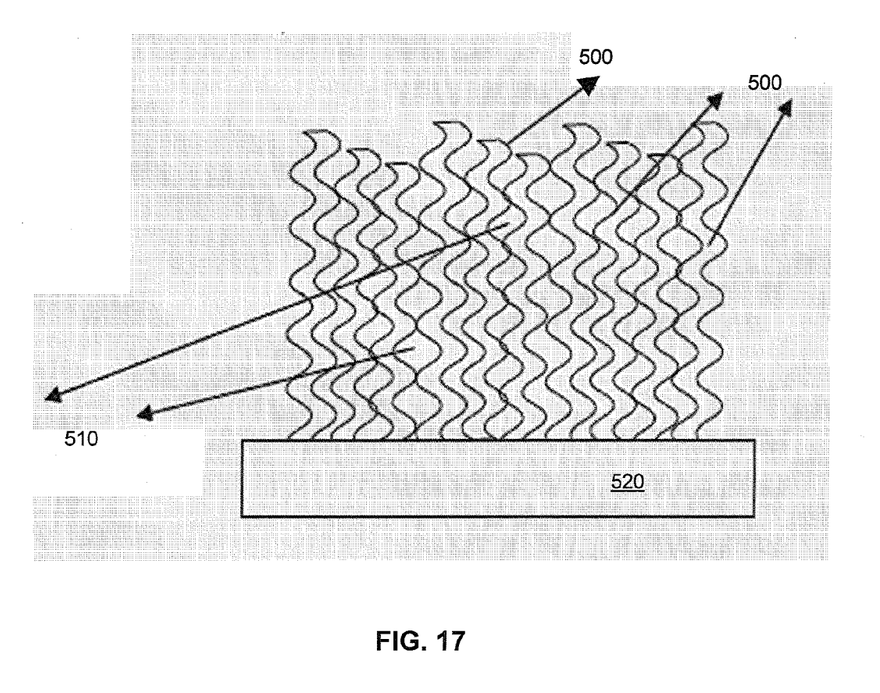
FIG. 17 is a cross-sectional view of a coating with one-layered semi-transparent flakes therein.

In one embodiment described herein with reference to FIG. 17, a substrate 520 has a coating thereon including a carrier 510 and transparent or semi-transparent grated flakes 500 having light transmittance of at least 50% in the visible spectrum. The flakes are single-layered flakes made of a material with a high refraction index, such as $Al_2O_3$, $TiO_2$, $ZnS$ materials. Each flake has a diffraction grating with a frequency of about 3500-4000 l/mm (333-250 nm pitch). The flakes 500 are oriented quasi-normally to the substrate 520, and the grooves are quasi-parallel to the substrate 520. The carrier having a lower index of refraction fills the pockets 510 between the flakes.

In the case of the Morpho butterflies, the ratio of the high refractive index (cuticle) and the low refractive index (air) is 1.6/1. Preferably, the ratio of the index of refraction of the flakes to the index of refraction of the carrier is higher than 1. As an example, a dielectric layer of $TiO_2$ with a refractive index of about 2.7 in a paint or ink carrier, with a refractive index of about 1.5, such as an acrylic base carrier, has the refractive index ratio even higher than in the Morpho butterflies. Therefore, single-layered flakes of a material with n>2.0 simulate a Morpho scale and create a $(HL)^n$ filter for simultaneous diffractive and thin film interference. The results obtained with a flake of only 3 grooves are similar to a sample coated with a conventional dichroic pigment having at least 6 layers of high- and low-index materials. More grooves would provide a higher selectivity of the wavelength following constructive interference, the same way as a greater number of HL interference layers. The single-layer diffractive flakes are more cost effective than a multilayered vacuum-coated design of interleaved high- and low-index layers. Advantageously, this invention allows the creation structures with small pockets of low-index material the structure of resembling hummingbird feathers described by Srinivasarao in *Nano-Optics In The Biological World: Beetles, Butterflies, Birds And Moths*, Chemical Reviews, 99, pp. 1935-1961, 1999.

The instant invention has been described above with reference to the external field being a magnetic field. Alternatively, the external field used for flake alignment may be an electrostatic field as taught, for example, in U.S. Pat. No. 6,829,075 issued Dec. 7, 2004, in the name of Kosc et al. incorporated herein by reference.

It has been disclosed by the inventor of the instant invention in U.S. Patent Application No. 20060263539 published on Nov. 23, 2006, and incorporated herein by reference, that grated dielectric flakes suspended in a dielectric carrier can be aligned in the same direction. By way of example, the grated flakes consisting of three layers: 50 nm $MgF_2$, 100 nm Si, and 50 nm $MgF_2$, and having a 500 l/mm grating, were suspended in a silicone oil and aligned using a 1500 V electric field.

Figure 18:
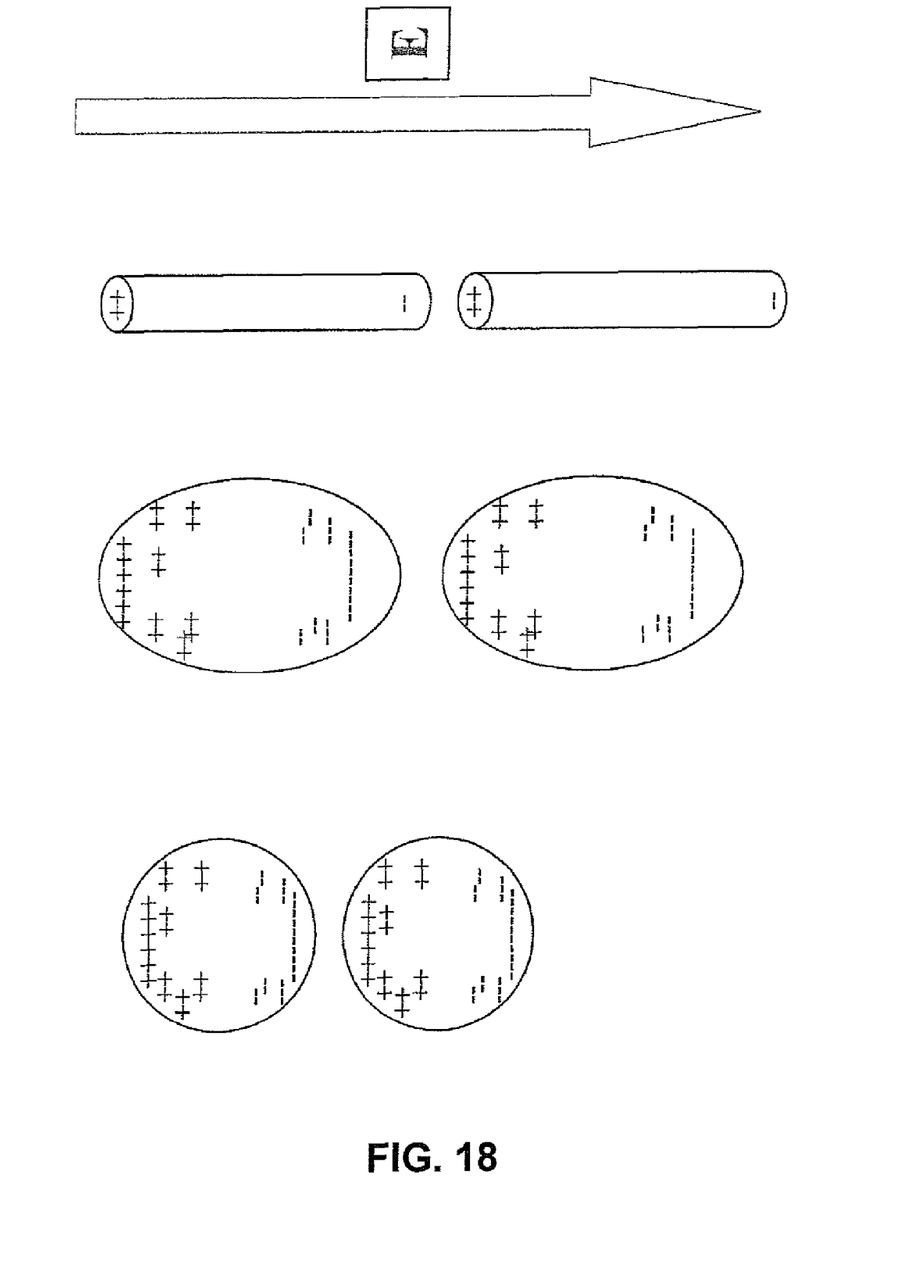
FIG. 18 is a diagram illustrating polarized particles aligned with an applied electric field.

Particles in a dielectric liquid are polarized by an applied electric field to get a dipole moment. The dipole moment present due to the field is influenced by the shape, size, and volume of the particles. By way of example, FIG. 18 shows the preferential orientation of simple shaped particles in an electric field. Both ellipsoid and rod shaped particles align with the electric field. Randomly shaped flakes align along their long axes as in a magnetic field.

A plurality of materials can be used as diffractive flakes for alignment within an electric field. It is not only the material of the suspended flakes that must be considered. The orientation will, in general, be a function of the difference in dielectric constants of the flakes and the carrier.

It has been found that polymers, semiconductors and ceramics (for example dielectric) flakes can be used in combination. By example of polymer it is believed that poly(p-phenylene-2,6-benzobisthiazole) (PBZT) which is a liquid crystalline polymer with semi-conductive properties can be oriented. Further examples of orientable non-magnetic materials formed into diffractive flakes can include ceramic such as $SiO_2$, $Al_2O_3$, which are typically used in electro-rheological fluids. Furthermore, Si, Ge, etc., can be used as metallic semiconductors diffractive flakes.

Our experiments clearly indicate the tendency for dielectric diffractive flakes to align with their diffractive grooves parallel to the field lines of an applied electric field.

Optionally, a coating of the instant invention contains other pigment particles including non-grated flakes or grated flakes lacking the desired orientation, for example, due to lack of a magnetic material or due to combination of a high viscosity of the carrier and a low strength of an external aligning field.

Preferably, parameters of the coating are chosen to provide that at least 50% of all grated flakes in the coating are oriented quasi-normally to a surface of the coated object, with their grooves oriented quasi-parallel to the surface. In our experiments, at least 70% of all grated flakes in the coating had said orientation, therefore 70% is a more preferable and achievable ratio. For appealing visual effects one needs at least 1000 and preferably 10000 flakes and a density of flakes of at least about 100,000 flakes per square millimeter.

Advantageously, diffractive flakes provide a cost effective solution to wavelengths-adjustable luminous sources used in the area of telecommunications and display devices. In a related work, M. Aschwanden and A. Stemmer (Optics Letters, Vol. 31, No 17, 2006) disclose a low-cost electrically tunable diffraction grating based on a dielectric elastomer diffractive actuator. When a voltage is applied to the actuator, the grating is elongated in the planar direction and the frequency of the grating is changed. As a result, the diffracted wavelength (color) emitted by the device changes as a function of the voltage when collimated white light is illuminating the device. Uma et al. (IEEE Journal of selected topics in quantum electronics, Vol. 10, No 3, 2004) teach a similar device for the same purposes of light modulation.

Figure 21:
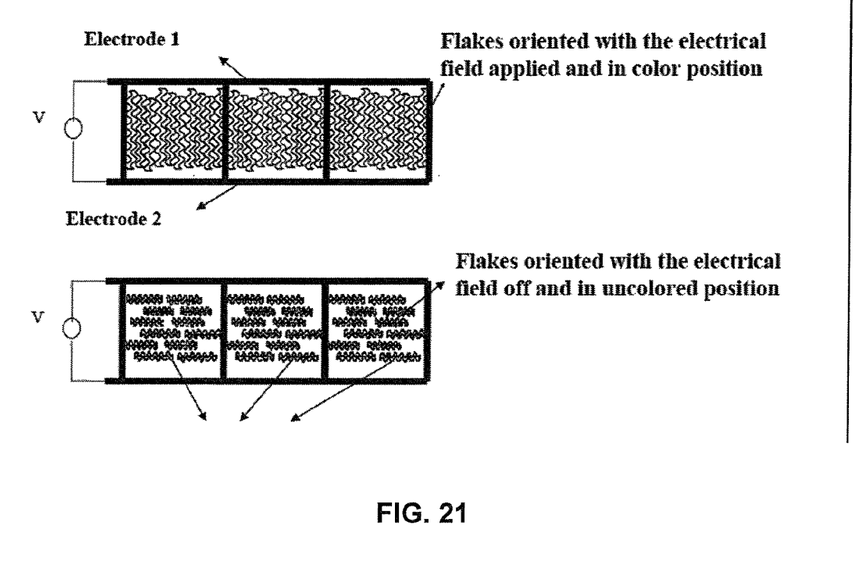
FIG. 21 is a schematic view if a device using alignable diffractive flakes.

Similar modulation effects can be obtained using active lector and/or magneto-optic devices as disclosed in U.S. Pat. No. 6,829,075 issued Dec. 7, 2004, in the name of Kosc et al., and U.S. Pat. No. 4,657,349 issued Apr. 14, 1987, in the name of Labes et al. The U.S. Pat. No. 6,829,075 teaches an active electro-optical device using layered non-diffractive flakes suspended in a fluid. The U.S. Pat. No. 4,657,349 discloses a similar electro- and magneto-optic device which comprises a fluid and anisotropic non-diffractive platelets used for information display or a field-controlled shutter in window glass. Such devices can be enhanced by the use of diffractive flakes presented in this disclosure. By way of example, a window made of two transparent glass planes coated with a transparent ITO film and having a coating made of a carrier and diffractive flakes between the glass planes, is transparent when the flakes are lying parallel to the glass planes, and becomes selectively colored with the application of an electrical field, so-called smart windows. The same or a similar device as shown in FIG. 1B from U.S. Pat. No. 6,829,075 can be used for each one of the 3 pixels of a typical color display system. The active colored position is when the flakes are parallel to the substrate as shown in FIG. 21. The color could be controlled by using diffractive flakes of different frequencies or by tilting the diffractive flakes in different angles.

In the instance of semitransparent flakes, the change of the path of light that creates constructive interference of the desire wavelength for a multilayer structure can be also controlled using a single kind of grated flakes embedded in different host fluid with different indexes of refraction. The change in the index of refraction of the fluid for a same kind of flakes will change the ratio of the high and low indexes and therefore the wavelength that will follow constructive interference. In the instance of opaque flakes, the change of index of refraction does not apply but the desire color can be obtained by reflected-diffractive interference of grated flakes of different frequencies and angles of orientation. The bottom and top electrodes can be made of transparent materials, such as an ITO film on glass, or one of the electrodes shown in FIG. 21 can be opaque. The display will be most probably easier to manufacture using electrical fields to position the flakes. However, using magnetic fields for the orientation could be considered. Preferably, the flakes are cross-grated flakes so that one direction of the grooves is parallel to the glass planes.

I claim:

1. A coating on a surface, comprising:
   a carrier and
   a plurality of flakes dispersed therein,
   wherein
   each of the plurality of flakes is oriented quasi-normally to the surface and has a first set of grooves extending along a first direction quasi-parallel to the surface;
   and wherein the plurality of flakes forms at least 50% of all grated flakes in the coating.

2. A coating as defined in claim 1, wherein at least 70% of the plurality of flakes are quasi-parallel to each other.

3. A coating as defined in claim 1, wherein each of the plurality of flakes has light transmittance of at least 50% in the visible spectrum.

4. A coating as defined in claim 3, wherein each of the plurality of flakes comprises a material having a first index of refraction and wherein the carrier has a second index of refraction, and wherein a ratio of the first index of refraction to the second index of refraction is higher than 1.

5. A coating as defined in claim 1, wherein each of the plurality of flakes has 250 nm to 2000 nm separations between adjacent grooves.

6. A coating as defined in claim 1, wherein each of the plurality of flakes has a second set of grooves extending along a second direction, forming an angle of at least 45 degrees with the first direction of the first set of grooves.

7. A coating as defined in claim 1, wherein each of the plurality of flakes has a predefined shape.

8. A coating as defined in claim 1, wherein the plurality of flakes forms at least 70% of all grated flakes in the coating.

9. A coating as defined in claim 1, wherein the plurality of flakes consists of at least 1000 flakes and a density of the flakes in the carrier is at least about 100,000 flakes per square millimeter.

10. An article comprising two transparent planes and a coating as defined in claim 1 therebetween, wherein the flakes are alignable in a magnetic or electric field.

11. A coating on a surface, comprising: a carrier, a first plurality of flakes dispersed in a first region of the coating and a second plurality of flakes disperse in a second region of the coating,
    wherein each of the first plurality of flakes is oriented quasi-normally to the surface and has a first set of grooves extending quasi-parallel to the surface.

12. The coating as defined in claim 11 wherein the second plurality of flakes are oriented parallel to the surface.

13. The coating as defined in claim 11 wherein the second plurality of flakes are oriented quasi-normally to the surface and have a second set of grooves quasi-parallel to the surface, and wherein the first plurality of flakes are tilted in a first direction and the second plurality of flakes are tilted in a second direction different from the first direction.

14. The coating as defined in claim 11 wherein the first plurality of flakes forms at least 50% of all grated flakes in the first region of the coating.

* * * * *